United States Patent [19]

McDaniel

[11] 4,169,926

[45] Oct. 2, 1979

[54] INORGANIC HYDROGELS AND USES THEREOF

[75] Inventor: Max P. McDaniel, Bartlesville, Okla.

[73] Assignee: Phillips Petroleum Company, Bartlesville, Okla.

[21] Appl. No.: 869,987

[22] Filed: Jan. 16, 1978

[51] Int. Cl.$^2$ .................. C08F 4/02; C08F 4/78; C08F 10/00
[52] U.S. Cl. .................. 526/106; 252/451; 252/452; 252/467; 252/469; 423/338; 423/339; 526/130
[58] Field of Search .............. 526/106, 130; 252/451, 252/452, 467, 469; 423/338, 339

[56] References Cited

U.S. PATENT DOCUMENTS

| | | | |
|---|---|---|---|
| 2,429,319 | 10/1947 | Kearby | 252/317 |
| 2,503,913 | 4/1950 | Kimberlin, Jr. et al. | 34/9 |
| 2,528,767 | 11/1950 | Marisic | 252/448 |
| 2,532,497 | 12/1950 | Hoekstra | 252/448 |
| 2,978,298 | 4/1961 | Wetzel et al. | 23/182 |
| 3,225,023 | 12/1965 | Hogan et al. | 260/94.9 |
| 3,652,215 | 3/1972 | Aboutboul et al. | 23/182 R |
| 3,652,216 | 3/1972 | Krekeler et al. | 23/182 |
| 3,862,104 | 1/1975 | Witt | 526/106 |
| 3,867,306 | 2/1975 | Witt et al. | 526/106 |
| 3,870,656 | 3/1975 | Brown et al. | 526/106 |
| 3,887,494 | 6/1975 | Dietz | 252/452 |
| 3,890,249 | 6/1975 | Dietz et al. | 526/106 |
| 3,900,457 | 8/1975 | Witt | 526/106 |
| 4,037,042 | 7/1977 | Mueller-Tamm et al. | 526/106 |
| 4,042,769 | 8/1977 | Lynch | 526/130 |
| 4,042,770 | 8/1977 | Bachl et al. | 526/106 |

FOREIGN PATENT DOCUMENTS

| | | | |
|---|---|---|---|
| 2411668 | 9/1975 | Fed. Rep. of Germany | 526/106 |
| 2411734 | 9/1975 | Fed. Rep. of Germany | 526/106 |

*Primary Examiner*—Alan Holler

[57] ABSTRACT

Inorganic hydrogels, e.g., silica-containing hydrogels, are contacted with contacting agents comprising oxygen-containing organic compounds and then dried to remove the liquid components therefrom. The contacting agent can also be an oxygen-containing organic compound in combination with a liquid hydrocarbon or an oxygen-containing compound in combination with a liquid hydrocarbon and a surfactant. The hydrogel can be treated with a catalytic metal compound prior to or during the contacting with the contacting agents in order to produce a composition after drying and calcining that is catalytically active for olefin polymerization. The treated hydrogel can also, after drying, be treated anhydrously with a catalytic metal compound to produce a composition that is active for 1-olefin polymerization upon calcination.

38 Claims, No Drawings

INORGANIC HYDROGELS AND USES THEREOF

This invention relates to the preparation of hydrogels. In another aspect, this invention relates to the preparation of silica-containing hydrogels. In yet another aspect, this invention relates to the treatment of hydrogels with an oxygen-containing, water-miscible organic compound. In yet another aspect, this invention relates to the contacting of hydrogels with polyhydric alcohols, the ether derivatives of alkylene and poly-(alkylene) glycols and mixtures thereof. In still another aspect, this invention relates to the contacting of hydrogels with a liquid hydrocarbon or a liquid hydrocarbon and a surfactant in combination with an oxygen-containing, water-miscible organic compound. In still another aspect, this invention relates to the preparation of an olefin polymerization catalyst. In still another aspect of this invention, hydrogel is treated with a catalytic metal compound prior to or during contacting the hydrogel with the contacting agents. Still another aspect of this invention is the use in an olefin polymerization of a supported catalyst prepared by incorporating catalytic material into the hydrogel prior to or during contacting the hydrogel with contacting agents. In still another aspect, this invention relates to the polymerization of ethylene wherein a silica- and chromium-containing hydrogel which was contacted with a normally liquid oxygen-containing, water-miscible organic compound alone or in combination with a liquid hydrocarbon or a liquid hydrocarbon plus a surfactant is used, after drying and calcining, as the catalyst for the polymerization process.

BACKGROUND OF THE INVENTION

Inorganic gels are well known and have long been used for various purposes, for example, for the adsorption of condensible vapors from gaseous carriers and for catalytic purposes either as a catalyst itself or as a component thereof or as a carrier. The most widely used of these inorganic gels in the dried condition is that of silica with or without the addition of other gelatinous materials such as alumina.

Inorganic gels in combination with a chromium compound have been found to be particularly useful as catalysts for carrying out reactions involving hydrocarbons, especially olefins such as ethylene, as disclosed in U.S. Pat. No. 3,887,494. It is known that the melt index and thus the molecular weight of an olefin polymer is responsive to the average pore diameter of the catalyst support. By increasing the average pore diameter of the catalyst support, therefore, there is achieved an increase in the melt index of the polymer prepared in the presence of a catalyst containing such support.

The manner in which a catalyst or support to be utilized in a catalytic composition is prepared can influence the average pore diameter of the support, and hence the melt index of the polymer prepared in the presence of the catalyst composition. Methods of preparing catalysts and inorganic hydrogels used in preparing catalyst compositions are well known in the art, such as those disclosed in U.S. Pat. No. 3,887,494; U.S. Pat. No. 2,978,298; U.S. Pat. No. 2,503,913; and U.S. Pat. No. 2,429,319.

In the preparation of an inorganic catalyst support from a hydrogel, e.g., a silica-containing hydrogel, an important step is the removal of water from the hydrogel or the drying of the hydrogel. The step is important in that the manner in which the water is removed has a great bearing upon the size of the pores of the catalyst support. One method of drying hydrogel is to heat the hydrogel at a high temperature in order to evaporate the water. A problem, however, is that the walls of the pores in the hydrogel are in a plastic condition during drying and, as a result of the high surface tension of the water, the capillary pores are pulled together as the water is evaporated, thereby leaving small pores in the dried hydrogel.

The prior art has somewhat overcome this problem by removing the water from the hydrogel through repeated washings with an organic compound or by azeotropic distillation. The organic compounds utilized are usually aliphatic monohydric alcohols or ketones, as disclosed in U.S. Pat. No. 2,429,319; U.S. Pat. No. 2,503,913; and U.S. Pat. No. 2,978,298. U.S. Pat. No. 2,503,913 also discloses the use of a water-immiscible liquid such as kerosene with or without a small amount of surface-active agent.

Surprisingly, however, it has been discovered that the use of oxygen-containing organic compounds selected from the group consisting of polyhydric alcohols, the mono- and dialkyl ethers of alkylene glycols and poly(alkylene) glycols and mixtures thereof, saves in the cost of the preparation of the dried hydrogels in that a costly azeotropic process is not used. Other unexpected results are that the pore size of the dried gels is not adversely affected by drying and hence the melt index of the polymers prepared over the catalyst compositions is improved over that obtained through the use of monohydric alcohols or ketones.

An object of the present invention, therefore, is to produce an improved dried inorganic hydrogel to be used as a catalyst support for olefin polymerization processes.

A further object of the present invention is to produce a dried inorganic hydrogel with increased pore volume.

An additional object of the present invention is to prepare a dried, chromium compound containing inorganic hydrogel that will yield a more effective catalyst, i.e., improve the polymer melt index of the polymer prepared in the presence of the catalyst.

A still further object of the present invention is to provide an improved process for polymerizing olefins.

Another object of this invention is to provide an improved catalyst for the polymerization of ethylene.

Other objects, aspects, and the several advantages of this invention will be apparent to those skilled in the art upon a study of this disclosure and the appended claims.

SUMMARY OF THE INVENTION

Inorganic hydrogels are contacted with contacting agents comprising normally liquid, oxygen-containing, water-miscible organic compounds. Following the contacting period, the gels are dried to remove the liquid components therefrom. The dried inorganic gel can then be impregnated anhydrously with a catalytic metal compound such as chromium and then calcined in air to produce a supported catalyst.

In one embodiment, the hydrogel is treated with an aqueous solution of a catalytic metal compound prior to or during contacting with the contacting agents.

The oxygen-containing organic compounds can be used alone as contacting agents, in combination with a normally liquid hydrocarbon(s), or in combination with said hydrocarbon(s) plus a minor amount of a surfactant. The inorganic hydrogels preferred in accordance with this invention are silica-containing hydrogels, and they can be dried in vacuo or in air, e.g., oven, heat lamp, vacuum oven, etc.

DETAILED DESCRIPTION OF THE INVENTION

The oxygen-containing organic compounds envisioned in this invention are normally liquid, water-miscible compounds selected from the group consisting of polyhydric alcohols, the mono- and dialkyl ethers of alkylene glycols and poly(alkylene) glycols and mixtures thereof. The preferred polyhydric alcohols to be employed, however, are those containing 2 to 3 hydroxyl groups per molecule. Exemplary compounds include glycerol, ethylene glycol, diethylene glycol, triethylene glycol, trimethylene glycol, tetramethylene glycol, heptamethylene glycol, 1,2-propylene glycol, dipropylene glycol, 1,3-butylene glycol, 1,4-butylene glycol, 1,2,6-hexanetriol, 1,2,4-butanetriol; poly(ethylene) glycols having average molecular weights up to about 750, poly(propylene) glycols having average molecular weights up to about 550, mixed poly(ethylene)-poly(propylene) glycols having average molecular weights up to about 750 and containing from about 40 to about 90 weight percent ethylene oxide; monomethyl, monoethyl, monobutyl ethers of ethylene glycol, propylene glycol and diethylene glycol; monomethyl and monoethyl ethers of triethylene glycol; dimethyl, diethyl ethers of diethylene glycol, dipropylene glycol, and triethylene glycol; thiodiethylene glycol, and the like, and mixtures thereof. The compounds and their manner of preparation are disclosed in Kirk-Othmer, Encyclopedia of Chemical Technology, Second Edition, Vol. 10, pages 638–674.

The normally liquid hydrocarbons, when employed in this invention, are generally selected from the group consisting of paraffins, cycloparaffins, aromatic hydrocarbons, and mixtures thereof having boiling points ranging from about 100°–260° C. Representative compounds include n-heptane, n-octane, 2-methylnonane, n-dodecane, n-tetradecane, methylcyclohexane, toluene, xylenes, and the like. A paraffin or mixture of paraffins, e.g., a refinery stream having a boiling point range of about 175°–240° C., is presently preferred because of ready availability and relatively low cost.

A surfactant, when employed, is selected from commercially available anionic, cationic, and nonionic compounds and mixtures thereof. The nature of the surfactant is not thought to be critical. Exemplary anionic surfactants include carboxylates of $(RCOO)^-(M)^+$ where R is an alkyl group of about 8 to 21 carbon atoms and M is usually Na or K or an ammonium ion, sulfonates of $R'SO_3Na$ where $R'$ is an alkyl or alkylarylene group of about 8 to 21 carbon atoms, alkyl sulfates of $R''OSO_3M$ where $R''$ is an alkyl group of about 8–21 carbon atoms and M is an ion selected from the group consisting of $NH_4$, Na, K, Mg, diethanolamine or triethanolamine, sulfated polyoxyethylene alkylphenols of $R'''C_6H_4(OCH_2CH)_n$—$OSO_3M$ where $R'''$ is an alkyl group of 1 to about 9 carbon atoms, M is $NH_4$, Na, or triethanolamine, and n is 1 to about 50, sodium dialkyl sulfosuccinates where the alkyl group contains about 5–13 carbon atoms, alkyl orthophosphate or alkyl polyphosphate esters, e.g., (2-ethylhexyl)$_5$Na$_5$(P$_3$O$_{10}$)$_2$, ethoxylated and phosphated alcohols such as 2-ethylhexanol, dodecanol-1 and the like, and phenol, nonylphenol, etc., and the like. Exemplary cationic surfactants include amine oxides as

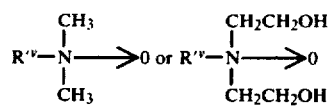

where $R'^v$ is selected from coco, tallow, lauryl, stearyl, cetyl, octadecyl, etc., quaternary ammonium salts such as

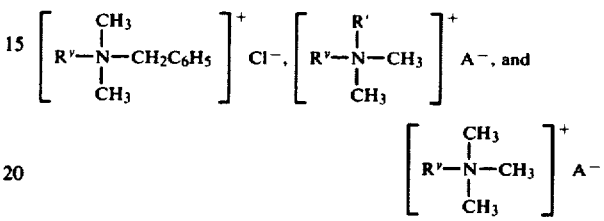

where $R^v$ is an alkyl group of 8–18 carbon atoms, tallow, coco, soya, and A is Br, Cl, and the like. Exemplary nonionic surfactants include ethoxylated aliphatic alcohols or alkyl phenols containing from about 12–18 carbon atoms per molecule and the mole ratio of combined ethylene oxide to hydrophobe varies from 1 to about 50, polyoxyethylene sorbitan fatty acid esters where the oxyethylene units per mole of ester ranges from about 4 to 20 and the ester is derived from lauric acid, stearic acid, etc., polysiloxane-polyoxyalkylene copolymers such as $C_2H_3Si(O(Si(CH_3)_2O_x(CH_2C-H_2O)_x(C_3H_6O)_yC_4H_9)_3$ where the organic portion is a mixed copolymer containing equal weights of ethylene and propylene oxides and terminated with a butoxy group, the silicone base and each of the three organic branch chains has a molecular weight of about 1,500, e.g., Union Carbide Corporation product designated L-520. The surfactants are more fully described in Kirk-Othmer, Encyclopedia of Chemical Technology, Second Edition, Vol. 19, pages 507–566.

Inorganic hydrogels, preferably silica-containing hydrogels, can be made by employing any of the well-known techniques of the prior art, e.g., such as that disclosed in U.S. Pat. No. 3,887,494.

The inorganic hydrogel is contacted with the contacting agents of the present invention and then subsequently dried by application of sufficient heat to remove the liquid components therefrom. The heating can be applied in vacuo or in air, e.g., in an oven or with a heat lamp. The weight ratio of contacting agent (CA) to hydrogel can vary rather widely from about 100:1 to about 0.5:1, more preferably from about 5:1 to about 1:1 for reasons of economy. Sufficient contacting time is allotted to obtain penetration of the contacting agent into the pores of the gel. Generally times ranging from about 30 seconds to about 10 hours are adequate. The treated hydrogel is then dried to remove the liquid components which can be recovered and separated if desired.

When a hydrocarbon and an oxygen-containing organic compound are employed, the weight ratio of hydrocarbon (HC) to oxygen compound (OC) can vary from about 20:1 to about 0.5:1. Preferred oxygen-containing organic compounds employed with the hydrocarbons are the ether derivatives of the oxygen-containing compounds since they are miscible with water as well as the hydrocarbons.

When employing a surfactant(s) with the hydrocarbon/oxygen-containing compound contacting agents, generally about 0.1 to about 5 weight percent surfactant(s) is used based on the weight of contacting agent.

In the context of this invention, miscibility is meant complete solubility of one liquid in another liquid at one extreme down to about 5 weight percent solubility as the other extreme. However, complete solubility is preferred because it results in more efficient contacting of the reactants.

The contacted hydrogel, after drying, is then prepared for employment in olefin polymerization by depositing anhydrously a catalytic metal compound such as chromium in the form of chromium acetate on the dry gel by methods which include nonaqueous solution impregnation and dry mixing techniques. Other suitable chromium compounds are chromium chloride, chromium trioxide, chromium sulfate, or any other chromium compound which can be subsequently converted to chromium oxide by calcination with at least a part of the chromium being converted to the hexavalent state.

The hydrogel, however, can also be treated with an aqueous solution of the catalytic metal compound either prior to or during contacting with a contacting agent. If the inorganic hydrogel had been impregnated with a catalytic metal compound before or during the contacting of the hydrogel with the contacting agents of the present invention, no further treatment with a catalytic metal compound such as chromium on the dry composite is necessary, although further impregnation can be made by anhydrous deposition.

The impregnation of the gel or hydrogel with the catalytic metal compound is carried out by conventional methods and followed by the usual calcination. After calcining, the resulting catalyst is employed in olefin polymerization employing any of the techniques which are employed when utilizing catalysts comprising a catalytic metal compound such as a chromium compound on an inorganic substrate such as a silica-containing substrate.

A better understanding of the invention will be obtained upon reference to the following illustrative examples which are not intended, however, to be unduly limiting of the invention.

EXAMPLE I

Portions of a silica-titania cogel hydrogel containing 14 weight percent solids and impregnated with chromium acetate so that the dry composite consisted of two weight percent titanium and one weight percent chromium were individually mixed with an oxygen-containing organic compound (OC). Each mixture was placed in an oven maintained at 160° C. and dried overnight (about 15 hours). Drying was continued one more hour at 160° C. under a partial vacuum, e.g., about 15 inches Hg (60° F.) (50 kPa). Each dried product was then calcined in air in a fluidized bed for five hours at 1600° F. (871° C.), recovered and stored in dry air until ready for use.

Ethylene was polymerized at 230° F. (110° C.) and 550 psig (3.8 MPa gage) in a stainless steel, stirred reactor of nominal one-gallon (3.8 l) capacity containing 1.5 pounds (0.68 kg) isobutane as diluent. (Particle form polymerization conditions.) Catalyst charged in the runs was in the range of 0.04 to 0.08 grams. Each polymerization run was of sufficient duration to produce about 5,000 g polyethylene per g catalyst. To obtain a true comparison of polymer melt index values among runs, the determined melt index values were adjusted to a productivity level of 5,000 g polymer per g catalyst, as is known in the art. Pore volume measurements, when indicated, represent the number of cc isopropanol adsorbed per g of catalyst calcined at 1600° F. The quantity of hydrogel, nature and amount of oxygen compound employed, and results obtained are presented in Table I. Melt index was determined according to ASTM D 1238-65 T (condition E).

TABLE I

| | | Effect of Hydrogel Treatment on Catalyst Melt Index Capability | | | | | |
|---|---|---|---|---|---|---|---|
| Run No. | Weight Hydrogel, g | Contacting Agent Organic Compound Name | g | Weight Ratio CA/Hydrogel | Catalyst Pore Volume, cc | Polymer Melt Index | Remarks |
| 1 | 70 | O | — | — | 0.90 | nd$^{(a)}$ | Control, MI <1>0 |
| 2 | 100 | Isopropanol | 79 | 0.8 | nd | 0.6 | Control |
| 3 | 70 | EtOEtOH$^{(b)}$ | 47 | 1.5 | 1.67 | 2.6 | Invention |
| 4 | 70 | EtOEtOH$^{(b)}$ | 56 | 1.2 | 1.44 | nd | Invention |
| 5 | 70 | BuOEtOH$^{(c)}$ | 45 | 1.6 | 1.81 | 3.0 | Invention |
| 6 | 70 | BuOEtOH$^{(c)}$ | 54 | 1.3 | 1.47 | 2.6 | Invention |
| 7 | 70 | Bu(OEt)$_2$OH$^{(d)}$ | 48 | 1.5 | 2.28 | nd | Invention |
| 8 | 70 | Bu(OEt)$_2$OH$^{(d)}$ | 67 | 1.0 | 1.89 | nd | Invention |
| 9 | 70 | Et(OEt)$_2$OEt$^{(e)}$ | 64 | 1.1 | 1.87 | nd | Invention |
| 10 | 100 | Et(OEt)$_2$OEt$^{(e)}$ | 91 | 1.1 | 2.60 | 5.8 | Invention |
| 11 | 70 | Me(OEt)$_2$OMe$^{(f)}$ | 52 | 1.3 | 1.99 | 3.4 | Invention |
| 12 | 70 | Me(OEt)$_3$OMe$^{(g)}$ | 60 | 0.86 | 1.88 | 1.6 | Invention |
| 13 | 35 | Me(OEt)$_3$OMe$^{(g)}$ | 30 | 0.86 | 2.51 | 7.6 | Invention |
| 14 | 35 | 1,2-Propanediol | 31 | 1.1 | 1.79 | nd | Invention |
| 15 | 35 | 1,3-Butanediol | 30 | 1.2 | 2.00 | nd | Invention |

$^{(a)}$Not determined.
$^{(b)}$Monoethyl ether of ethylene glycol.
$^{(c)}$Mono-n-butyl ether of ethylene glycol.
$^{(d)}$Mono-n-butyl ether of diethylene glycol.
$^{(e)}$Diethyl ether of diethylene glycol.
$^{(f)}$Dimethyl ether of diethylene glycol.
$^{(g)}$Dimethyl ether of triethylene glycol.

The results presented in Table I show that the ether derivatives of ethylene glycol used in Runs 3-6, the ether derivatives of higher glycols used in Runs 7-13, 1,2-propanediol used in Run 14, and 1,3-butanediol used in Run 15 are all more effective in improving melt index capability of the catalyst than a monohydric alcohol exemplified by isopropanol in Run 2. The results are based on higher pore volumes and/or higher polymer melt index values associated with the invention compounds.

EXAMPLE II

Individual portions of the hydrogel used in Example I were mixed with an oxygen-containing compound (OC) and a hydrocarbon (HC). Each mixture was dried, calcined, and employed to polymerize ethylene in the manner previously described.

The quantities and nature of the compounds used and the results obtained are given in Table II.

TABLE II

| | | Melt Index Capability of Treated Hydrogel | | | | | | | | |
|---|---|---|---|---|---|---|---|---|---|---|
| | | Contacting Agent (CA) | | | | | Weight Ratios | | Polymer Melt Index | Catalyst Pore Volume, cc |
| Run No. | Weight Hydrogel, g | Hydrocarbon (HC) Type | g | Oxygen Compound (OC) Type | g | Surfactant Type | Wt. % | CA/Hydrogel | HC/OC | | Remarks |
| 1 | 70 | 0 | — | 0 | — | 0 | — | — | — | nd[h] | 0.9 | Control, MI <1>0 |
| 2 | 70 | 0 | — | BuOEtOH[a] | 54 | 0 | — | 0.8 | — | 2.6 | 1.47 | Invention |
| 3 | 100 | 0 | — | Isopropanol | 79 | 0 | — | 0.8 | — | 0.6 | nd | Control |
| 4 | 100 | Soltrol® 170[b] | 74 | 0 | — | Anionic[c] | 1.9 | 0.7 | — | 4.0 | 2.97 | |
| | | | | | | Nonionic[d] | 0.6 | | | | | Control |
| 5 | 70 | Soltrol® 130[e] | 74 | BuOEtOH | 45 | 0 | — | 1.7 | 1.6 | 6.5 | 2.52 | Invention |
| 6 | 70 | Soltrol® 170 | 52 | BuOEtOH | 36 | 0 | — | 1.3 | 1.4 | 6.9 | 2.57 | Invention |
| 7 | 100 | Soltrol® 130 | 74 | Isopropanol | 45 | 0 | — | 1.7 | 1.6 | 0.8 | nd | Control |
| 8 | 100 | Soltrol® 170 | 56 | BuOEtOH | 32 | Nonionic[f] | 1 | 0.9 | 1.8 | 6.6 | 2.70 | Invention |
| 9 | 100 | Soltrol® 170 | 56 | Isopropanol | 32 | Nonionic[f] | 1 | 0.9 | 1.8 | 1.4 | nd | Control |
| 10 | 70 | Soltrol® 170 | 52 | Bu(OEt)₂OH[g] | 19 | 0 | — | 1 | 2.7 | nd | 1.92 | Invention |
| 11 | 70 | Soltrol® 170 | 52 | Bu(OEt)₂OH[g] | 38 | 0 | — | 1.3 | 1.4 | nd | 2.04 | Invention |
| 12 | 70 | Kerosene | 38 | Bu(OEt)₂OH[g] | 19 | 0 | — | 0.8 | 2 | nd | 2.00 | Invention |

[a] Mono-n-butyl ether of ethylene glycol.
[b] A registered trademark of Phillips Petroleum Company, Bartlesville, OK; refinery product, hydrocarbon mixture, 218–238° C. boiling range.
[c] Richonate YLA ®, The Richardson Co., Des Plaines, IL; reported to be isorpopylamine dodecylbenzenesulfonate.
[d] Span 20 ®, Atlas Chemical Industries B.V. Belgium; sorbitan monolaurate.
[e] A registered trademark of Phillips Petroleum Company, Bartlesville, OK; refinery product, hydrocarbon mixture, 176–207° C. boiling range.
[f] Span 60 ®; sorbitan monolaurate.
[g] Mono-n-butyl ether of diethylene glycol.
[h] Not determined.

The results presented in Table II show that a combination of a hydrocarbon and the defined oxygen-containing compound is more effective in terms of improving melt index capability of a catalyst than either component alone. This is clearly shown in the data given in Runs 2, 4–6, and 8. Control Runs 3, 7, and 9 demonstrate that substitution of a monohydric alcohol for the ether derivatives of the glycols employed gives results inferior to the invention combination of reagents. Runs 10–12 show that kerosene can be substituted for Soltrol ® hydrocarbons and used in combination with the oxygen-containing compound to improve melt index capability of catalysts prepared from the treated hydrogels based on pore volume measurements. Generally, as the pore volume of the catalysts increases, the melt index capability of those catalysts is increased. This can be seen by comparing the results obtained in Runs 2, 4–6, and 8.

Reasonable variations and modifications which will become apparent to those skilled in the art can be made in the present invention without departing from the spirit and scope thereof.

I claim:

1. A method for drying an inorganic hydrogel comprising contacting said hydrogel with a contacting agent which comprises a normally liquid, oxygen-containing, water-miscible organic compound selected from the group consisting of polyhydric alcohols, the mono- and dialkyl ethers of alkylene glycols and poly(alkylene) glycols and mixtures thereof, for a length of time sufficient to obtain penetration of the contacting agent into the pores of the hydrogel and then applying sufficient heat to the treated hydrogel to remove the liquid components therefrom.

2. A method according to claim 1 wherein said inorganic hydrogel is a silica-containing hydrogel.

3. A method according to claim 1 wherein said contacting agent further comprises a normally liquid hydrocarbon in combination with said oxygen-containing organic compound.

4. A method according to claim 3 wherein said normally liquid hydrocarbon is selected from the group consisting of paraffins, cycloparaffins, aromatic hydrocarbons, and mixtures thereof having boiling points ranging from about 100°–260° C.

5. A method according to claim 4 wherein said liquid hydrocarbon is a paraffin or mixture thereof constituting a refinery stream having a boiling point range of about 175°–240° C.

6. A method according to claim 3 wherein said contacting agent further comprises a surfactant.

7. A method for drying an inorganic hydrogel comprising contacting said hydrogel with a contacting agent which comprises a normally liquid, oxygen-containing, water-miscible organic compound selected from the group consisting of the mono- and dialkyl ethers of alkylene glycols and poly(alkylene) glycols in combination with a normally liquid hydrocarbon for a length of time sufficient to obtain penetration of the contacting agent into the pores of the hydrogel and then drying said treated hydrogel by the application of sufficient heat to remove the liquid components therefrom.

8. A method according to claim 7 wherein said contacting agent further comprises a surfactant.

9. A method according to claim 1 wherein the weight ratio of the contacting agent to hydrogel is in the range from about 100:1 to about 0.5:1.

10. A method according to claim 3 wherein the weight ratio of the hydrocarbon to the oxygen-containing organic compound is in the range from about 20:1 to about 0.5:1.

11. A method according to claim 6 wherein the weight percent of said surfactant, based on the weight of the contacting agent, is in the range of about 0.1 to 5 weight percent.

12. A method according to claim 1 wherein said treated hydrogel is dried in a vacuum oven.

13. A method of preparing a silica-containing composition catalytically active for olefin polymerization comprising:
   (a) contacting a silica-containing hydrogel with a contacting agent comprising a normally liquid, water-miscible organic compound selected from the group consisting of polyhydric alcohols, the mono- and dialkyl ethers of alkylene glycols and poly(alkylene) glycols and mixtures thereof for a length of time sufficient to obtain penetration of the contacting agent into the pores of the hydrogel;
   (b) drying the treated hydrogel sufficiently to remove the liquid components therefrom;
   (c) incorporating anhydrously a catalytic metal compound into the dried gel; and
   (d) calcining the gel in air to produce a composition catalytically active for olefin polymerization.

14. A method according to claim 13 wherein said contacting agent further comprises a normally liquid hydrocarbon in combination with said oxygen-containing organic compound.

15. A method according to claim 14 wherein said normally liquid hydrocarbon is selected from the group consisting of paraffins, cycloparaffins, aromatic hydrocarbons, and mixtures thereof having boiling points ranging from about 100°–260° C.

16. A method according to claim 15 wherein said liquid hydrocarbon is a paraffin or mixture thereof constituting a refinery stream having a boiling point range of about 175°–240° C.

17. A method according to claim 14 wherein said contacting agent further comprises a surfactant.

18. A method according to claim 13 wherein the weight ratio of the contacting agent to hydrogel is in the range from about 100:1 to about 0.5:1.

19. A method according to claim 14 wherein the weight ratio of the hydrocarbon to the oxygen-containing organic compound is in the range from about 20:1 to about 0.5:1.

20. A method according to claim 17 wherein the weight percent of said surfactant, based on the weight of the contacting agent, is in the range of about 0.1 to 5 weight percent.

21. A method according to claim 13 wherein said treated hydrogel is dried in a vacuum oven.

22. A method of preparing a silica-containing composition catalytically active for olefin polymerization comprising:
   (a) contacting a silica-containing hydrogel with a contacting agent comprising a normally liquid, water-miscible organic compound selected from the group consisting of the mono- and dialkyl ethers of alkylene glycols and poly(alkylene) glycols in combination with a normally liquid hydrocarbon for a length of time sufficient to obtain penetration of the contacting agent into the pores of the hydrogel;
   (b) drying the treated hydrogel by the application of sufficient heat to remove the liquid components therefrom;
   (c) incorporating anhydrously a catalytic metal compound into the dried gel; and
   (d) calcining the gel in air to produce a composition catalytically active for olefin polymerization.

23. A method according to claim 22 wherein said contacting agent of step (a) further comprises a surfactant.

24. A method according to claim 13 wherein said catalytic metal compound of step (c) is a chromium compound.

25. A method of preparing a silica-containing composition catalytically active for olefin polymerization comprising:
   (a) contacting a silica-containing hydrogel, in which a catalytic metal compound has been incorporated, with a contacting agent comprising a normally liquid, water-miscible organic compound selected from the group consisting of polyhydric alcohols, the mono- and dialkyl ethers of alkylene glycols and poly(alkylene) glycols and mixtures thereof for a length of time sufficient to obtain penetration of the contacting agent into the pores of the hydrogel;
   (b) drying the treated hydrogel by the application of sufficient heat to remove the liquid components therefrom; and
   (c) calcining the impregnated gel in air to produce a composition catalytically active for olefin polymerization.

26. A method according to claim 25 wherein said contacting agent further comprises a normally liquid hydrocarbon in combination with said oxygen-containing organic compound.

27. A method according to claim 26 wherein said normally liquid hydrocarbon is selected from the group consisting of paraffins, cycloparaffins, aromatic hydrocarbons, and mixtures thereof having boiling points ranging from about 100°–260° C.

28. A method according to claim 27 wherein said liquid hydrocarbon is a paraffin or mixture thereof constituting a refinery stream having a boiling point range of about 175°–240° C.

29. A method according to claim 26 wherein said contacting agent further comprises a surfactant.

30. A method according to claim 25 wherein:
   said silica-containing hydrogel is a silica-titania cogel hydrogel;
   said catalytic metal compound is chromium acetate; and
   said contacting agent is selected from the group consisting of monoethyl ether of ethylene glycol, mono-n-butyl ether of ethylene glycol, mono-n-butyl ether of diethylene glycol, diethyl ether of diethylene glycol, dimethyl ether of diethylene glycol, dimethyl ether of triethylene glycol, 1,2-propanediol, and 1,3-butanediol.

31. A method according to claim 26 wherein:
   said silica-containing hydrogel is a silica-titania cogel hydrogel;
   said catalytic metal compound is chromium acetate; and
   said contacting agent is selected from the group consisting of a refinery product hydrocarbon mixture having a boiling range of about 218°–238° C. in combination with mono-n-butyl ether of diethylene glycol and a refinery product hydrocarbon mixture having a boiling range of about 176°–207° C. in combination with mono-n-butyl ether of diethylene glycol.

32. A method according to claim 29 wherein:

said silica-containing hydrogel is a silica-titania cogel hydrogel, said catalytic metal compound is chromium acetate, and said contacting agent is a refinery product hydrocarbon mixture having a boiling range of about 218°–238° C. in combination with mono-n-butyl ether of diethylene glycol and sorbitan monolaurate.

33. A method of polymerizing olefins in the presence of a catalyst wherein said catalyst is the product of the method in claim 25.

34. A method of polymerizing olefins in the presence of a catalyst wherein said catalyst is the product of the method in claim 13.

35. A method according to claim 33 in which said olefin is ethylene.

36. A method according to claim 34 in which said olefin is ethylene.

37. An olefin polymerization catalyst produced by the method of claim 13.

38. An olefin polymerization catalyst produced by the method of claim 25.

* * * * *